United States Patent [19]
Knott

[11] 4,245,847

[45] Jan. 20, 1981

[54] WHEELCHAIR

[76] Inventor: Christopher Knott, "Monza", New Hill, Walesby, Near Newark, Nottinghamshire, England

[21] Appl. No.: 41,854

[22] Filed: May 24, 1979

Related U.S. Application Data

[63] Continuation-in-part of Ser. No. 847,344, Oct. 31, 1977, abandoned.

[51] Int. Cl.[3] .......................... B62M 1/00; B62B 9/02

[52] U.S. Cl. .................................. 280/5.2; 280/47.16

[58] Field of Search ...................... 280/5.2, 5.22, 5.24, 280/5.26, 5.28, 5.3, 5.32, DIG. 10, 242 WC, 47.12, 47.16, 104, 677, 80 R, 81 R; 180/8 F, DIG. 3; 297/DIG. 4

[56] References Cited

U.S. PATENT DOCUMENTS

| | | | |
|---|---|---|---|
| 865,514 | 9/1907 | Mullenmeister | 280/DIG. 10 |
| 1,226,848 | 5/1917 | Black | 280/5.32 |
| 2,285,699 | 6/1942 | Everest | 280/47.16 |
| 2,986,200 | 5/1961 | Nobile | 297/DIG. 4 |
| 3,100,547 | 8/1963 | Rosenthal | 280/DIG. 10 |
| 3,591,195 | 7/1971 | Ilon | 280/5.28 |

*Primary Examiner*—John J. Love
*Assistant Examiner*—Randall A. Schrecengost
*Attorney, Agent, or Firm*—Pollock, VandeSande and Priddy

[57] ABSTRACT

A wheelchair suitable for invalids or geriatric patients has a chair or seat supported on independant forward and rearward castor frames pivotally connected together at a transverse axis to form a castor frame assembly. The chair is pivotally mounted on the forward and rearward castor frames so that in negotiating a step or other obstacle, the lifting movement of the occupant is divided into stages so that a pleasant or comfortable ride is obtained. The wheelchair may be folded into a collapsed condition with the chair itself located between the castor frames.

7 Claims, 6 Drawing Figures

WHEELCHAIR

CROSS-REFERENCE TO RELATED APPLICATION

This application is a continuation-in-part of Application Serial No. 847,344, filed Oct. 31, 1977 and now abandoned.

BACKGROUND OF THE INVENTION

This invention relates to wheelchairs suitable for invalids or geriatric patients and is a continuation-in-part of my U.S. Patent Application No. 847,344 filed Oct. 31, 1977 and now abandoned.

Wheelchairs hitherto have had a number of disadvantages particularly as regards the comfort of the user when traversing uneven ground or ascending and descending curbs. The vertical movement of the side wheels in negotiating an uneven surface or a curb is transmitted to the seat and the occupant resulting in a bumpy and unpleasant ride unless compensated by complex expensive and bulky springing. It is also difficult to negotiate steps, curbs or depressions since when the wheels lift the chair over such steps, curbs or depressions, the chair and its occupant is lifted in one movement.

SUMMARY OF THE INVENTION

A wheelchair according to the invention comprises a castor frame assembly formed of forward and rearward castor frames pivotally connected one to the other about a transverse pivotal axis and each carrying at least one ground-engaging castor, a pair of independently rotatable ground-engaging wheels mounted one on each side of the castor frame assembly between the castors of the forward and rearward castor frames respectively, and a chair mounted on the forward castor frame rearwardly of the forward castor or castors and mounted on and pivotable relative to, the rearward castor frame forwardly of the rearward castor or castors.

The ground-engaging side wheels adjacent the sides of the chair preferably rotate about the transverse pivotal axis of the castor frame assembly and are preferably each provided with a conventional hand-wheel, of diameter slightly less than that of the ground-engaging wheels, to enable a user to propel the chair manually.

Because the chair is mounted straddling the front and rear castor frames, the weight of a user is distributed between the side wheels, the forward castor wheel or wheels and the rearward castor wheel or wheels. If the wheelchair travels over an uneven surface the forward and rearward castor wheels can rise or fall with accompanying pivoting of the forward and rearward castor frames. The mounting of the chair ensures that only a proportion of this movement is transmitted to the chair and occupant. Similarly when the side wheels rise or fall when riding over an obstacle, only a proportion of that vertical movement is transmitted to the chair and occupant. The result is a pleasant and comfortable ride without the need for complex expensive and bulky springing.

The positioning of the forward and rearward mountings of the chair dictates the ability of the wheelchair to negotiate steps, curbs or depressions in a satisfactory manner. It has been found suitable to mount the chair on the rear half of the forward castor frame and on the front half of the rearward castor frame. Not only does this provide for satisfactory negotiation of obstacles, but also enables the side wheels more easily to be placed in a position comfortable to the user and avoids excessive protrusion of the rear castor frame behind the chair where it could be a nuisance to a person pushing the chair.

Because the rear castor wheel or wheels exerts a stabilizing influence, the wheelchair is not prone to tipping backwards when travelling up steep slopes. Even if only one castor wheel is provided at the front and only one at the back, the wheelchair is particularly maneuverable.

The wheelchair may be folded for storage by removing the side wheels, collapsing the seat and pivoting the forward and rearward castor frames to lie one over the other. Preferably the mounting of the chair on both the forward and rearward castor frames is by means of pivotal linkages which do not have to be disconnected in order to fold the wheelchair, the chair structure in the folded condition of the wheelchair lying between the castor frames.

The seat and backrest are preferably rigid and shaped to suit medical requirements, but may be of canvas.

DESCRIPTION

Figure 1:
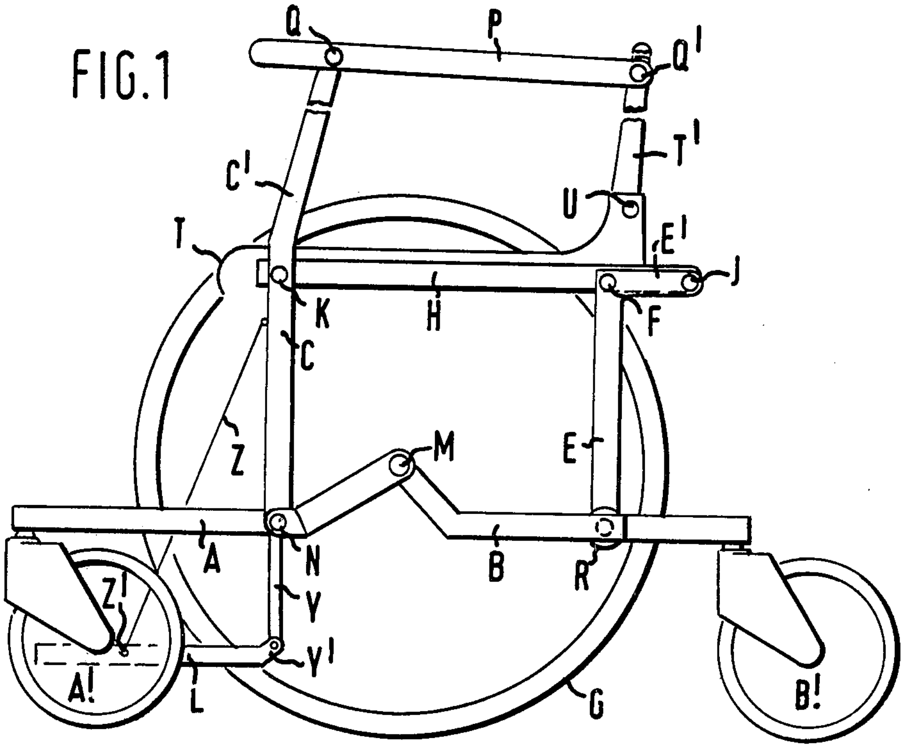
FIG. 1 is a schematic side view of a wheelchair according to the invention, with only one side wheel shown for clarity.
Figure 2:
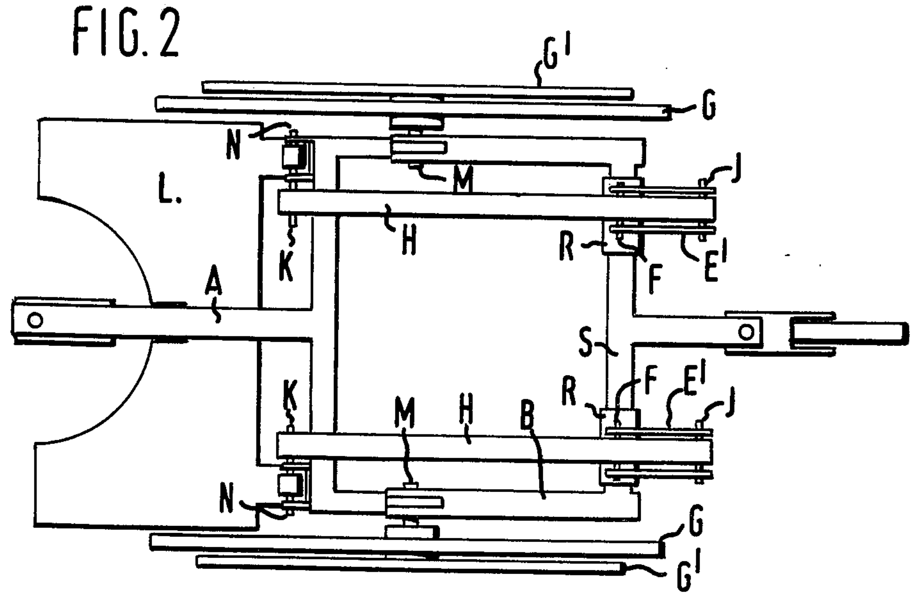
FIG. 2 is a plan view from above of the wheelchair of FIG. 1 with the back support armrests and cross members removed.
Figure 3:
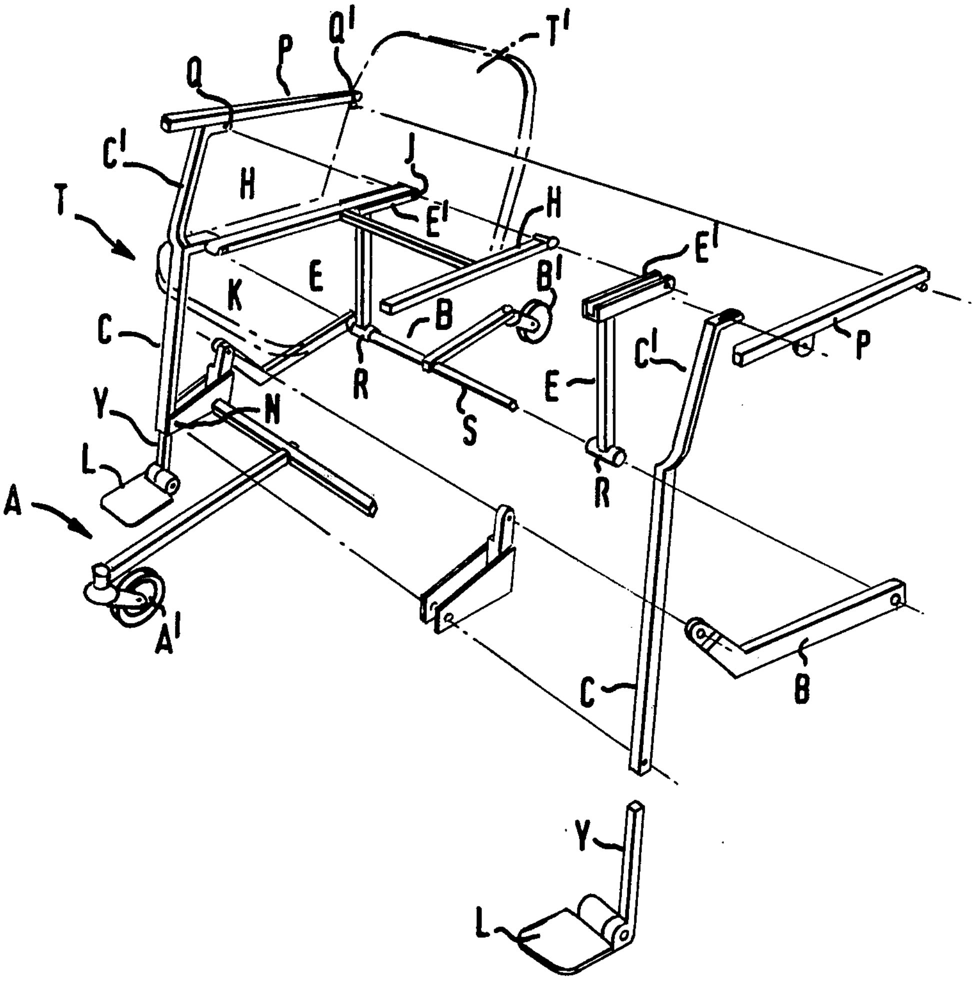
FIG. 3 is an exploded view of the frame of the wheelchair shown in FIG. 1 with the seat shown in phantom and with the side wheels not shown for the sake of clarity.

The wheelchair shown in the drawings comprises a forward castor frame A carrying at its front end a castor wheel A′ and pivoted at its rear end about a pair of stub axles M defining a central pivotal axis. A rearward castor frame B carries at its rear end a castor wheel B′ and is pivoted at its front end about the stub axles M. Side wheels G are detachably secured to the stub axles M and are provided with hand wheels G′ for movement of the wheelchair by an occupant. Pivot pins N mounted on the forward castor frame A provide a forward chair mounting by pivotally mounting front chair legs C. Each leg C is provided with an upward extension C′ forming an armrest support member. Collars R rotatable on a transverse portion S of the rearward castor frame B provide a rearward chair mounting by supporting rear chair legs E. The top ends of each pair of legs C and E, at seat height, are connected by a longitudinal member H. The seat T is secured to the members H. The members H are pivotally mounted on the front chair legs C by means of pivot pins K and on the rear ends of rearward rigid extensions E′ of the rear chair legs E by pivot pins J. The members H are releasably secured to the front ends of the rigid extensions E′ of the rear chair legs E by locking pins F passing through the members H beneath the seat T.

The seat T has a back T' which can be folded flat against the base of the seat by pivoting on pins U. Armrests P are pivoted to the armrest support members C' and to the back of the seat T at pivot pins Q and Q'.

In the operational position of the wheelchair the rear chair legs E are rigidly secured to the longitudinal chair frame members H by means of locking pins F. The rear legs E and longitudinal membes H pivot together on collars R which are rotatable on the transverse portion S of rearward castor frame B. The pivot pins N and collars R respectively securing the lower ends of the forward and rearward chair legs C and E to the castor frames A and B are located to opposite sides of the stub axles M. The weight of an occupant of the wheelchair transmitted via legs C and E therefore urges castor wheels A' and B' downwardly and reinforces the inherent stability of the wheelchair. The pins N permit relative angular movement between the forward castor frame A and the front chair legs C. The pins K permit relative angular movement between the front legs C and the rear legs E. The collars R permit relative angular movement between the rear legs E and the rear castor frame B. In consequence, when relative angular movement between castor frames A and B takes place, this can be accommodated by pivotal movement between the chair legs C and E and the longitudinal seat member H. The armrests P and the seat back T' pivot about pins Q, Q' and U and offer no resistance to relative movement of the legs C and E and member H consequent on relative movement of the castor frames A and B'.

A footrest L is carried beneath the forward castor frame A by members Y and chains Z which are connected to the footrest L at Z'. For stowage, each member Y slides telescopically within an associated member C, permitting the footrest L to lie flush with the forward castor frame A. Rearmost portions of the footrest L are pivoted at Y' to the base of the members Y to enable the footrest to be lifted to a vertical condition beneath the front of the seat and parallel to the front legs C. A cutaway portion of the footrest L is provided to avoid interference with the forward castor frame A when the footrest is in the vertical condition.

In use, when the wheelchair rides over, for example, a curb, first the forward castor A' contacts the curb and rises. Some but not all of this lift is transferred to the chair and occupant due to the lifting of the forward chair mounting on the forward castor frame A. When the side wheels ride over the curb, which they are better able to do because of their larger diameter, the forward castor frame A resumes the horizontal condition and a part of the lift is again transferred to the chair and occupant. However, not until the rear castor B' rises over the curb is the final portion of the lift imparted to the chair and occupant. Analogous considerations apply when descending a curb.

Figure 4:
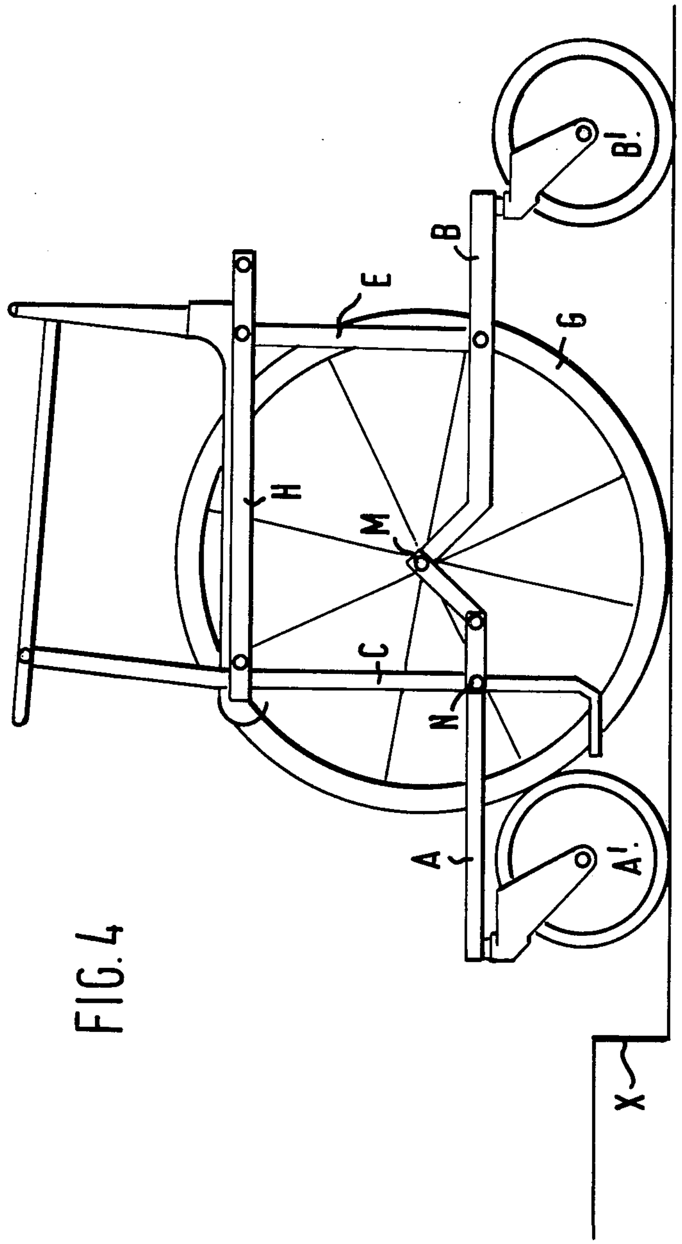
FIG. 4 is a diagrammatic view of the chair approaching a step.
Figure 5:
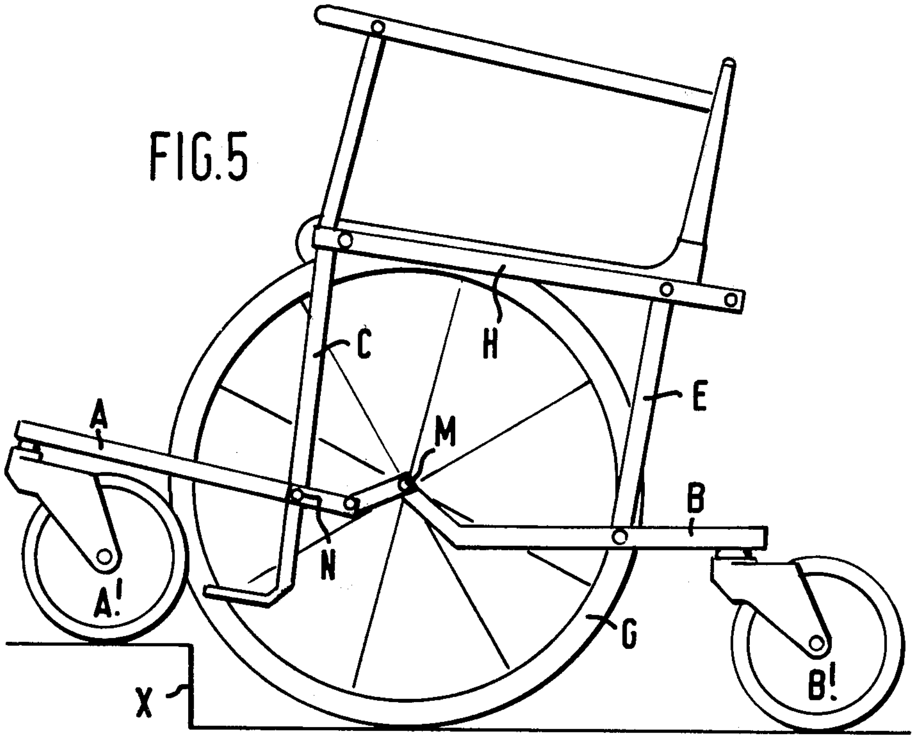
FIG. 5 is a similar view showing the chair with its front castor wheel having surmounted the step.
Figure 6:
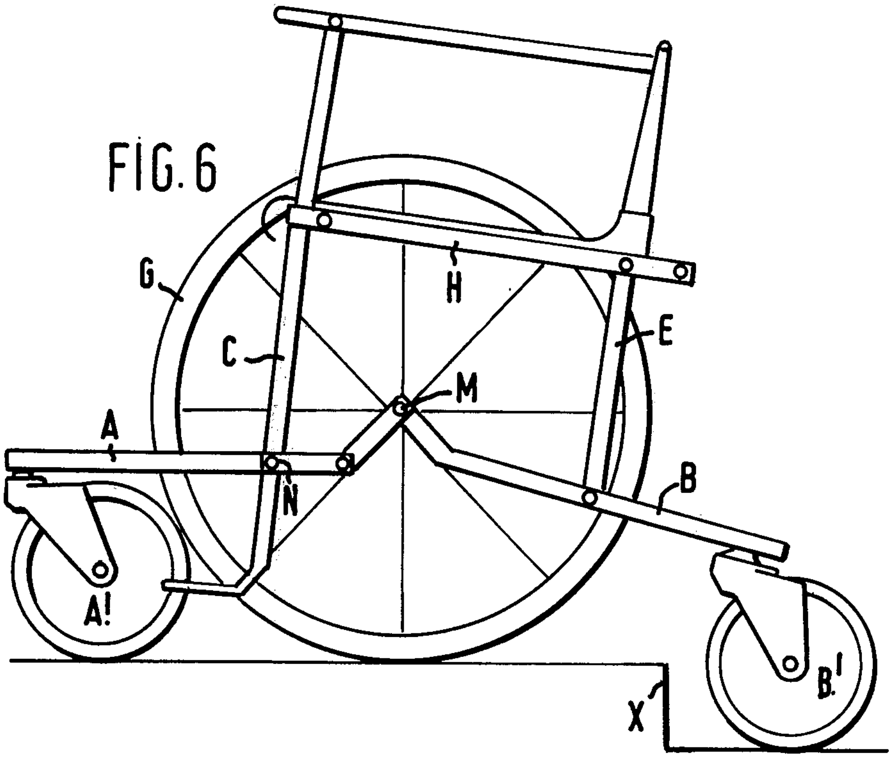
FIG. 6 is a similar view showing the chair with its ground wheels having surmounted the step.

The sequence of operations is clearly shown in FIGS. 4 to 6. As the wheelchair approaches the curb X, and the castor A' rides over it, the forward castor frame A pivots about the pin M while the rear castor frame B remains horizontal as shown in FIG. 5. The seat is raised during this first stage by reason of its support from the frame A. On further forward movement, the ground wheels G contact the curb X and ride over it, lifting the seat through a second stage. When the ground wheels G have surmounted the curb, the front castor frame A resumes its horizontal position while the rear castor frame B assumes an inclined position as shown in FIG. 6. Further forward movement of the wheelchair raises the rear castor wheel B' to surmount the curb, raising the seat through the third stage and returning the wheelchair to the position shown in FIG. 4.

To fold the wheelchair, each-cross member H is unlocked from its horizontal condition by releasing the locking pins F. The chair legs C and E, the cross members H and the seat T are then pivoted forwards until the legs E are inside and parallel to the corresponding sections of the rearward castor frame B. The folded combination of the frame B, the rear legs E and the cross member H is then lifted and rotated about the central axis M until the frame B lies over the frame A, with the chair assembly sandwiched between the frames A and B. The rear end of the frame A is in fact upturned to provide a space between the frames, in the folded condition, to accomodate the chair assembly.

Finally the two side wheels G are removed completely and the castors A' and B' are adjusted to lie flush with the framework.

I claim:

1. A wheelchair comprising a forward castor frame, an independent rearward castor frame pivotally connected to said forward castor frame at a transverse axis of pivotal connection which interconnects said frames to form a castor frame assembly, each of said castor frames carrying at least one ground engaging castor, a pair of independently rotatable ground engaging wheels mounted one on each side of said castor frame assembly between the castors of said forward and rearward castor frames respectively, said wheel chair including a chair seat which, in said collapsed condition being mounted on said forward castor frame rearwardly of the castor on said forward castor frame, and rear chair legs mounted on said rearward castor frame forwardly of the castor on said rearward castor frame, said rear chair legs being pivotable relative to said rearward castor frame.

2. The wheelchair defined in claim 1, wherein said front chair legs are mounted on the rear half of the forward castor frame and said rear chair legs are mounted on the front half of the rearward castor frame.

3. The wheelchair defined in claim 1, wherein said forward castor frame carries a single castor wheel.

4. The wheelchair defined in claim 1, wherein said rearward castor frame carries a single castor wheel.

5. The wheelchair defined in claim 1, wherein said ground engaging wheels are rotatable about the transverse axis of the pivotal connection between said forward castor frame and said rearward castor frame.

6. The wheelchair defined in claim 1, wherein the chair legs are mounted on both the forward and rearward castor frames by pivotal mountings permitting folding of the wheelchair to a collapsed position without disconnection of said mountings.

7. A wheel chair as defined in claim 1, foldable to a collapsed condition, said ground engaging wheels being pivoted to said caster frame assembly for rotation about an axis directed transversely of said castor frame assembly, front chair legs pivotably located between the castor frames.

* * * * *